United States Patent
Jovanovic et al.

(10) Patent No.: US 11,224,837 B2
(45) Date of Patent: Jan. 18, 2022

(54) POST-COMBUSTION CARBON DIOXIDE CAPTURE AND COMPRESSION

(71) Applicant: Linde Aktiengesellschaft, Munich (DE)

(72) Inventors: Stevan Jovanovic, North Plainfield, NJ (US); Ramachandran Krish Krishnamurthy, Bridgewater, NJ (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 16/680,869

(22) Filed: Nov. 12, 2019

(65) Prior Publication Data

US 2020/0147544 A1  May 14, 2020

Related U.S. Application Data

(60) Provisional application No. 62/758,797, filed on Nov. 12, 2018.

(51) Int. Cl.
| | |
|---|---|
| *B01D 53/62* | (2006.01) |
| *B01D 53/14* | (2006.01) |
| *B01D 53/48* | (2006.01) |
| *B01D 53/96* | (2006.01) |
| *B01D 53/18* | (2006.01) |

(52) U.S. Cl.
CPC ..... *B01D 53/1475* (2013.01); *B01D 53/1406* (2013.01); *B01D 53/1418* (2013.01); *B01D 53/1425* (2013.01); *B01D 53/48* (2013.01); *B01D 53/62* (2013.01); *B01D 53/96* (2013.01); *B01D 53/18* (2013.01); *B01D 2252/10* (2013.01); *B01D 2252/204* (2013.01); *B01D 2257/504* (2013.01); *B01D 2258/0283* (2013.01)

(58) Field of Classification Search
None
See application file for complete search history.

(56) References Cited

U.S. PATENT DOCUMENTS

| | | | |
|---|---|---|---|
| 2008/0173585 A1* | 7/2008 | White | C01B 32/50 210/656 |
| 2013/0081409 A1* | 4/2013 | Gonzalez Salazar | B01D 53/002 62/3.1 |
| 2013/0229012 A1* | 9/2013 | Jovanovic | F01K 13/00 290/52 |
| 2013/0327025 A1* | 12/2013 | Shimamura | B01D 53/1475 60/274 |

* cited by examiner

*Primary Examiner* — Daniel Berns
(74) *Attorney, Agent, or Firm* — Millen White Zelano & Branigan, PC; Brion P. Heaney

(57) ABSTRACT

A method is provided in which a carbon dioxide containing flue gas is provided by combusting a carbonaceous fuel in a high pressure steam generating unit using combustion air, and in which the carbon dioxide in the flue gas is at least partially captured and compressed in a carbon dioxide capture and compression unit having a carbon dioxide scrubber operated with an absorbing liquid which is regenerated using low pressure steam. The combustion air used in the high pressure steam generating unit is at least partially heated using sensible heat of the flue gas and/or the steam used for regenerating the absorption liquid of the carbon dioxide scrubber is at least partially generated using sensible heat of the flue gas. A corresponding system is also described herein.

20 Claims, 3 Drawing Sheets

POST-COMBUSTION CARBON DIOXIDE CAPTURE AND COMPRESSION

BACKGROUND OF THE INVENTION

The present invention relates to a method in which a carbon dioxide containing flue gas is provided and in which the carbon dioxide in the flue gas is at least partially captured and compressed. The present invention also relates to a corresponding system.

Capturing carbon dioxide from combustion flue gases is known. As e.g. outlined in the article "Carbon Dioxide" in Ullmann's Encyclopedia of Industrial Chemistry, online publication 30 May 2014, doi: 10.1002/14356007.a05_165.pub2, section 6.2, "Carbon Dioxide from Flue Gases," carbon dioxide is a component of all flue gases produced by the complete combustion of carbonaceous fuels. Carbon dioxide concentrations in such gases are typically in the range of 10 to 18 vol %. They can be higher when a so-called oxygen-enriched combustion is performed.

For capturing carbon dioxide, flue gases are typically cleaned from particles and passed through a water scrubber and/or a flue gas desulphurisation system before they are classically subjected to an alkaline carbonate solution or an amine solution in order to absorb carbon dioxide. As mentioned in the article cited, although the manufacture of carbon dioxide by this method was previously of a considerable commercial importance, it is now often not considered economically viable. Particularly for enhanced oil recovery projects which require vast quantities of carbon dioxide, however, such techniques were recently being revived and improved.

The incentive for compressing carbon dioxide is to reduce its volume for bulk transport. When carbon dioxide is compressed beyond its critical point at 73.8 bara, it is, due to its extremely high density of up to 800 kg/m$^3$, also referred to as a "dense fluid."

A number of different compressor types can be used for carbon dioxide compression. Axial compressors are generally used for compressing carbon dioxide in the gaseous phase to about 6 bara. For higher pressures of up to about 16 bara, axial/radial compressors are typically used. Axial/radial compressors comprise several axial stages followed by several radial stages mounted on a single shaft.

Centrifugal compressors, particularly integrally geared types of such compressors, are advantageous for compressing gases with high volume ratios like carbon dioxide, because each pinion speed can be optimised to maximise stage performance and hence minimise the overall power requirement in such arrangements. A compressor gearbox in such compressors can be arranged with up to four pinion shafts (i.e. eight stages) driven from a single centrally-mounted bull wheel.

Multi-stage centrifugal compressors for carbon dioxide are typically provided with inter-stage cooling and condensate removal. Also provision can be made for dehydration during compression to meet pipeline material constraints, as well as to avoid hydrate formation in pipelines. With multi-stage centrifugal compressors, pressures far beyond the critical point, e.g. up to about 200 bara, can be obtained.

The object of the present invention is to provide improvements, particularly relating to energy efficiency, in methods and corresponding devices in which a flue gas containing carbon dioxide is provided and in which the carbon dioxide in the flue gas is at least partially captured and compressed.

SUMMARY OF THE INVENTION

This object is solved according to the present invention by providing a method in which a carbon dioxide containing flue gas is provided and in which the carbon dioxide in the flue gas is at least partially captured and compressed, and a corresponding system comprising the features of the independent claims. Advantageous embodiments are subject of the dependent claims and of the description that follows.

Significant developments were reported and demonstrated related to carbon dioxide capture technologies from power generation plants. The present invention particularly is of advantage for use in such power generation plants, or at least in plants or systems wherein high pressure steam is generated in a high pressure steam generating unit. In a power generation plant, the high pressure steam is used to drive a turbine or turbine unit which is coupled with the shaft of an electric generator.

The most mature technologies for post combustion carbon dioxide capture are based on absorption processes. Aqueous amine based solvents are the most commonly used chemicals to absorb carbon dioxide from a flue gas stream at low pressure, followed by solvent regeneration and subsequent carbon dioxide compression typically required for sequestration or carbon dioxide enhanced oil recovery options which are the most likely outlets for very large quantities of generated and captured carbon dioxide from power plants, as already mentioned in the outset.

Various amines, e.g. monoethanolamine, are typically used as the chemicals to absorb carbon dioxide from a flue gas stream. Cold solutions of these organic compounds bind carbon dioxide, but the binding is reversed at higher temperatures:

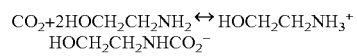

Carbon dioxide can therefore be driven out from an amine solution by increasing the temperature, thereby both recovering the carbon dioxide and by regenerating the amine solution for further use. Corresponding units for removing carbon dioxide from flue gas streams are in the language commonly used also referred to as "scrubbers." For further details, reference is made to corresponding expert literature, e.g. G. T. Rochelle, Science 325 (5948), 2009, pp. 1652-1654.

One of the major challenges in post combustion carbon capture technologies is the high amount of thermal energy required for solvent regeneration in a scrubber which significantly reduces net power generation efficiency of power plants with carbon dioxide capture. This thermal energy can be provided by condensing a low pressure steam extracted from an intermediate pressure steam turbine, as also shown in FIG. 1 described below, while cooling water is typically used for inter-stage coolers for the multistage carbon dioxide compression.

In addition to developing new solvents with lower required energy for its regeneration, a significant additional energy reduction can be achieved with innovative process configurations, integrations and waste heat recovery options which are the subject of the present invention. With these options which are described in detail below, several technical problems can be solved with significantly improved process performance indicators as compared with prior art post combustion carbon dioxide capture technology process configurations. According to the present invention, a reduced amount of thermal energy needs to be extracted for solvent regeneration. Overall, this leads to an increased power generation efficiency because no steam needs to be withdrawn from the steam turbine. This leads to a reduced cost of electricity and to a reduced cost of captured carbon dioxide.

The present invention provides a method in which a carbon dioxide containing flue gas is provided by combusting a carbonaceous fuel like coal, oil or natural gas in a high pressure steam generating unit using combustion air. The high pressure steam generating unit may particularly comprise one or more steam boilers with burners in which the combustion of the carbonaceous fuel is combusted. The high pressure steam generating unit can be provided as generally known in the prior art and may e.g. comprise means for generating saturated steam and for superheating the saturated steam as generally known in the art.

According to the method of the present invention, the carbon dioxide in the flue gas is at least partially captured and compressed in a carbon dioxide capture and compression unit comprising a carbon dioxide scrubber operated with an absorbing liquid which is regenerated using low pressure steam. As to details of scrubbers which can be utilised according to the present invention, reference is made to the explanations above and to some details further provided below. As mentioned, a significant part of the energy used in post combustion carbon dioxide recovery is used in regenerating absorbing liquids loaded with carbon dioxide.

According to the present invention, the combustion air used in the high pressure steam generating unit is at least partially heated using sensible heat of the flue gas and/or the steam used for regenerating the absorption liquid of the carbon dioxide scrubber is at least partially generated using sensible heat of the flue gas. Instead of condensing steam from a steam turbine, as known from the prior art, the present invention therefore suggests to use sensible heat from the flue gas, i.e. to perform a corresponding heat integration. This proves particularly advantageous and energy saving as compared to the prior art, for the reasons already mentioned.

According to a particularly preferred embodiment of the present invention, carbon dioxide obtained in the carbon dioxide scrubber from the flue gas is at least partially compressed in a carbon dioxide compressor of the carbon dioxide capture and compression unit, high pressure steam is generated from feed water in the high pressure steam generating unit, and the feed water used in the high pressure steam generating unit is at least partially preheated using compression heat withdrawn from the carbon dioxide compressed in the carbon dioxide compressor.

In proposed innovative process configurations and their embodiments as explained herein, multiple steps are taken alternatively or simultaneously to reduce overall thermal energy for solvent regeneration and to increase power generation efficiency, including waste heat recovery from flue gas downstream of a conventional boiler and waste heat recovery from carbon dioxide compression trains. The latter is particularly advantageous as the heat provided in such a compression train particularly matches the heat required for feed water preheating.

According to the present invention, advantageously a multi-stage centrifugal compressor is used as the carbon dioxide compressor of the carbon dioxide capture and compression unit, and the compression heat is withdrawn from the carbon dioxide compressed in the multi-stage centrifugal compressor between at least two of the stages of the multi-stage centrifugal compressor. Particularly, the feed water can be used to intercool the carbon dioxide between or after all or several of the compression stages of a corresponding compressor.

According to a particularly preferred embodiment of the present invention, the high pressure steam generated in the high pressure steam generating unit is at least partially expanded in a turbine unit, condensate is formed in the turbine unit, and the condensate formed in the turbine unit is at least partially used as the feed water which is used in the high pressure steam generating unit at least partially preheated using compression heat withdrawn from the carbon dioxide compressed in the carbon dioxide compressor. In other words, this condensate is recycled, after preheating, to the steam generation in this preferred embodiment, thereby significantly improving the mutual integration of the corresponding method steps.

In the present invention, preheating condensate as feed water before being fed to the boiler feed water heating system reduces low pressure and intermediate pressure steam extractions from turbine system and ultimately increases power generation efficiency. This approach can be also used to reduce needed heat recovery from flue gas downstream one or more treatment steps explained below, which may in turn increase the flue gas feed temperature to a desulphurisation unit and consequently reduces capital cost potentially caused by a necessity to utilise corrosive resistant materials for waste heat recovery heat exchangers to prevent equipment damage caused by acid condensation when high sulphur content coal is used.

According to a particularly preferred variant of the embodiment just described, the flue gas is at least in part transferred from the high pressure steam generating unit to one or more treatment units arranged downstream of the high pressure steam generating unit and thereafter to the carbon dioxide capture and compression unit arranged downstream of the one or more treatment units. The treatment units may particularly include a particle removal unit and a sulphur removal unit. A filtering unit and/or an electrostatic precipitator may be used as the particle removal unit. As to such options for flue gas treatment units, reference is made to general expert literature. Generally, the flue gas can be driven by one or more fans through corresponding units.

A temperature of the flue gas downstream of the high pressure steam generating unit and upstream of the one or more treatment units may be particularly at 150 to 450° C., especially at 200 to 400° C., and/or a temperature downstream of the one treatment unit or downstream of one of the more than one treatment units may particularly at 150 to 300° C., especially at 200 to 250° C. The various energy recovery options provided by the present invention may particularly be adapted to these temperatures, minimising energy losses and maximising energy utilisation.

Particularly, the combustion air used in the high pressure steam generating unit may at least partially heated using sensible heat of the flue gas transferred from the flue gas downstream of the high pressure steam generating unit and upstream of the one or more treatment units and/or the steam used for regenerating the absorption liquid of the carbon dioxide scrubber is at least partially generated using sensible heat of the flue gas transferred from the flue gas downstream of the high pressure steam generating unit and upstream of the one or more treatment units.

A method according to a particularly preferred embodiment of the present invention includes that first the combustion air used in the high pressure steam generating unit is at least partially heated using sensible heat of the flue gas transferred from the flue gas downstream of the high pressure steam generating unit and upstream of the one or more treatment units and thereafter the steam used for regenerating the absorption liquid of the carbon dioxide scrubber is at least partially generated using sensible heat of the flue gas transferred from the flue gas downstream of the high pressure steam generating unit and upstream of the one or more treatment units. This maximises energy utilisation due to an adaption of the energy demand to the energy provided.

A highly preferred variant of the embodiments just described include that the combustion air used in the high pressure steam generating unit is initially fully heated using sensible heat of the flue gas transferred from the flue gas downstream of the one treatment unit or downstream of one of the more than one treatment units and that the combustion air used in the high pressure steam generating unit is afterwards partially further heated using sensible heat of the flue gas transferred from the flue gas downstream of the high pressure steam generating unit and upstream of the one or more treatment units. This allows for the generation of low pressure steam at temperatures equal or greater than 160° C. and pressures equal or greater than 5 bara which is generally sufficient for the entire solvent regeneration of the plant. The part of the air not further heated using sensible heat of the flue gas transferred from the flue gas downstream of the high pressure steam generating unit and upstream of the one or more treatment units may be used in a different part of the high pressure steam generating unit than the part further heated. Particularly, the part not further heated may be directly introduced into the high pressure steam generating unit and the part further heated may be admixed to the fuel and may be introduced together with the fuel into the high pressure steam generating unit.

As frequently mentioned before, the carbon dioxide scrubber may according to the present invention be operated with a caustic solution and/or an amine solution which is loaded with carbon dioxide in an absorbing tower and which is regenerated using the low pressure steam in a regeneration tower.

The present invention also relates to a system adapted to provide a carbon dioxide containing flue gas by combusting a carbonaceous fuel in a high pressure steam generating unit using combustion air, and further adapted to at least partially capture and compress the carbon dioxide in the flue gas in a carbon dioxide capture and compression unit comprising a carbon dioxide scrubber, wherein the carbon dioxide scrubber is adapted to be operated with an absorbing liquid and to regenerate the absorbing liquid using low pressure steam. According to the present invention, the system is adapted to at least partially heat the combustion air used in the high pressure steam generating unit using sensible heat of the flue gas and/or at least partially generate the steam used for regenerating the absorption liquid of the carbon dioxide scrubber using sensible heat of the flue gas.

As to specific features and advantages of a corresponding system, which is particularly provided with means adapted to perform a method as described before, reference is made to the explanations above.

The present invention and their specific embodiments will be further described with reference to the appended drawings.

In the figures, reference is made to non-inventive methods and to methods according to embodiments of the present invention. These explanations likewise relate to corresponding systems. If, therefore, reference is made to method steps, the corresponding explanations also relate to technical units used in these.

DETAILED DESCRIPTION OF THE INVENTION

Figure 1:
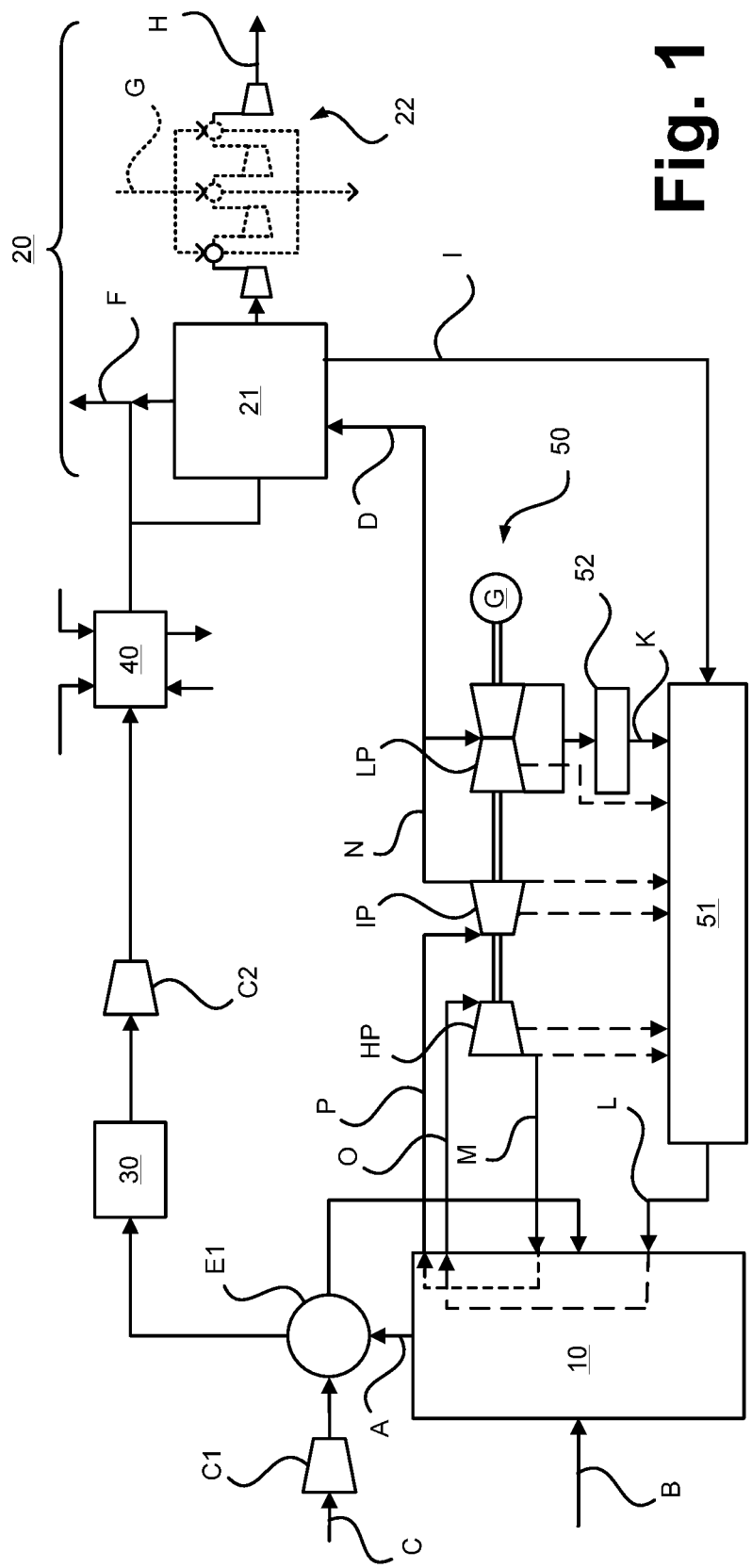
FIG. 1 illustrates a non-inventive method in which a flue gas containing carbon dioxide is provided and in which the carbon dioxide in the flue gas is at least partially captured and compressed.

FIG. 1 illustrates a non-inventive method in which a flue gas containing carbon dioxide is provided and in which the carbon dioxide in the flue gas is at least partially captured and compressed.

In the method according to FIG. 1, a carbon dioxide containing flue gas stream A is provided by combusting a carbonaceous fuel B, e.g. coal, in a high pressure steam generating unit 10 using combustion air C which is also supplied to the high pressure steam generating unit 10. As mentioned, the high pressure steam generating unit 10 may comprise one or more steam boilers, burners and the like. The combustion air C is compressed in a combustion air compressor C1 and thereafter heated in a heat exchanger E1 using sensible heat of the flue gas stream A. The flue gas stream A is, after being passed through the heat exchanger E1, transferred to a particle removal unit 30 which may comprise an electrostatic precipitator or a filter arrangement ("bag house"). After slightly compressing the flue gas stream A in a flue gas fan C2, it is further passed to a flue gas desulphurisation unit 40 in which further auxiliary streams (water, air, lime stone, gypsum) which are not individually indicated may be used or provided, respectively.

The flue gas stream A leaving the flue gas desulphurisation unit 40 is transferred to a carbon dioxide capture and compression unit 20 comprising a carbon dioxide scrubber 21 operated with an absorbing liquid (not shown) which is regenerated using low pressure steam of a steam stream D. The carbon dioxide capture and compression unit 20 further comprises a carbon dioxide compressor 22 which particularly may be a multi-stage compressor, as mentioned. Carbon dioxide E withdrawn from the carbon dioxide scrubber 21 is compressed in the carbon dioxide compressor 22. A rest F of the flue gas may be withdrawn from the carbon dioxide scrubber 21 and is e.g. vented to the atmosphere. The individual compression stages of the carbon dioxide compressor 22 are not indicated in detail. The carbon dioxide compressor 22 is adapted for intercooling the carbon dioxide between the individual compression stages using a stream G of cooling water. A compressed carbon dioxide product is withdrawn from the carbon dioxide compressor 22 as a product stream H.

Low pressure water I is withdrawn from the carbon dioxide scrubber 21 and is transferred to a feed water heating arrangement 51 associated with a turbine unit 50. The turbine unit 50 further comprises a high pressure turbine HP, an intermediate pressure turbine IP and a low pressure turbine LP which are coupled via a common shaft to an electric power generator G. Expanded steam from the high pressure turbine HP, an intermediate pressure turbine IP and a low pressure turbine LP, shown as dashed arrows, and condensate K from the low pressure turbine LP formed in a condensor 52 is supplied to the feed water heating arrangement 51. Feed water L heated in the feed water heating arrangement 51 is transferred to the high pressure steam generating unit 10 for steam production. Expanded steam M from the high pressure turbine HP is also partially recycled into the high pressure steam generating unit 10 and expanded steam N from the intermediate pressure turbine IP is also partially transferred to the low pressure steam turbines LP. Some of the steam N expanded in the intermediate pressure turbine IP is also transferred as the steam stream D to the carbon dioxide scrubber 21. From the high pressure steam generating unit 10, a high pressure steam stream O is transferred to the high pressure turbine HP and an intermediate pressure steam stream P is transferred to the intermediate pressure turbine IP.

Figure 2:
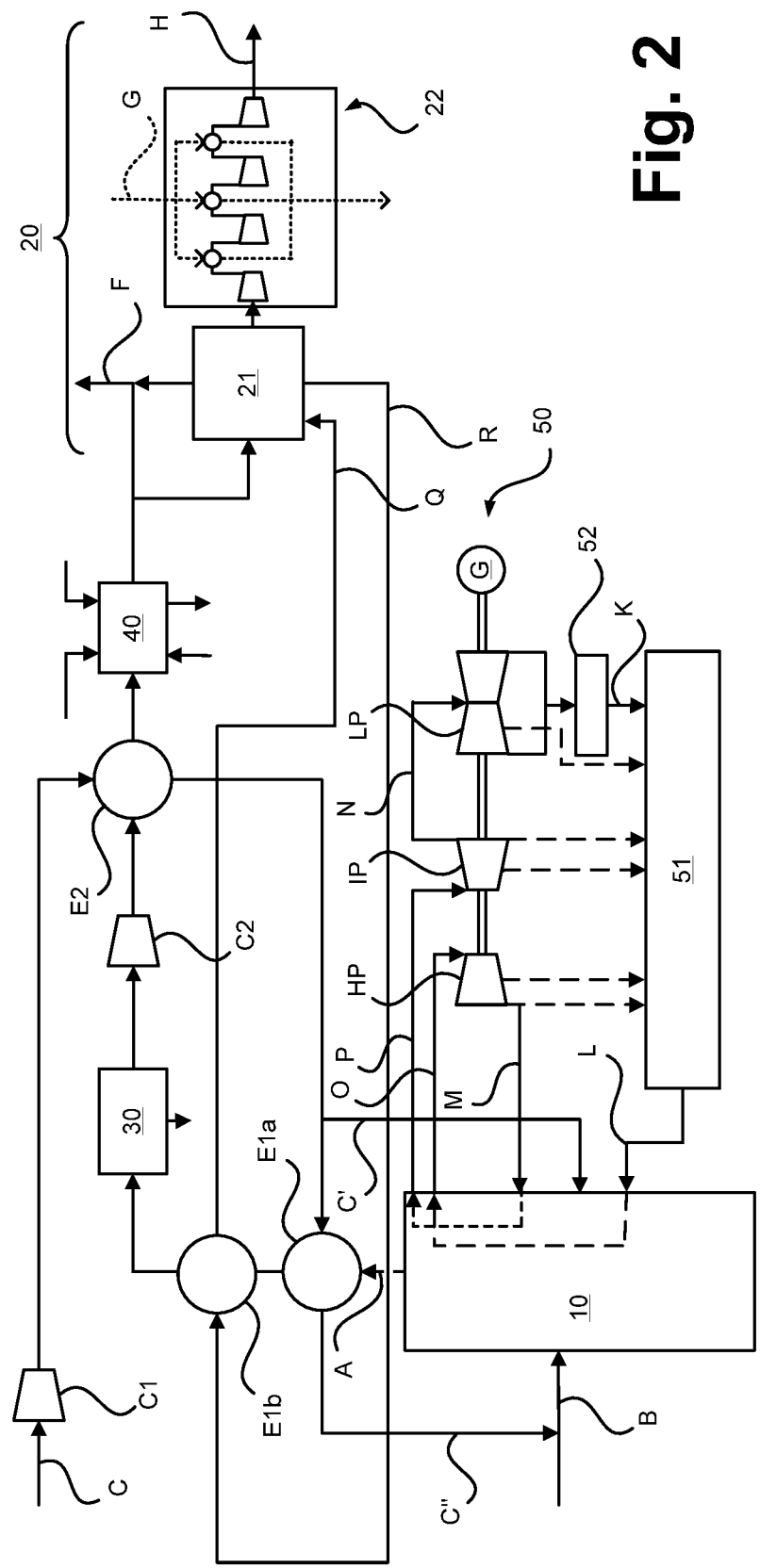
FIG. 2 illustrates a method in which a flue gas containing carbon dioxide is provided and in which the carbon dioxide in the flue gas is at least partially captured and compressed according to an embodiment of the invention.

FIG. 2 illustrates a method in which a flue gas containing carbon dioxide is provided and in which the carbon dioxide in the flue gas is at least partially captured and compressed according to an embodiment of the invention. The method is referred to with reference numeral 100.

Like in the non-inventive method according to FIG. 1, in the method 100 according to FIG. 2 a carbon dioxide containing flue gas stream A is provided by combusting a carbonaceous fuel B, e.g. coal, in a high pressure steam generating unit 10 using combustion air C. The combustion air C is, however, in the method 100 according to FIG. 2 supplied to one part C' to the high pressure steam generating unit 10 directly and to a further part C" to the carbonaceous fuel B in order to heat the latter.

As before, the high pressure steam generating unit 10 may comprise one or more steam boilers, burners and the like, and the combustion air C is compressed in a combustion air compressor C1. However, the combustion air C is, in the method 100 according to FIG. 2, first heated in a heat exchanger E2 in the flue gas stream downstream of the flue gas fan C2. The part C' supplied directly to the high pressure steam generating unit 10 is no further heated. The part C" supplied to the carbonaceous fuel B in order to heat the latter is further heated in a heat exchanger E1a which partially substitutes the heat exchanger E1 according to FIG. 1.

The flue gas stream A is, after being passed through the heat exchanger E1a and subsequently thereto through a heat exchanger E1b, also here transferred to a particle removal unit 30 which may comprise an electrostatic precipitator or a filter arrangement. After slightly compressing the flue gas stream A in a flue gas fan C2, it is, as before, further passed to a flue gas desulphurisation unit 40 to which further auxiliary streams which are not individually indicated may be provided.

The flue gas stream A leaving the flue gas desulphurisation unit 40 is transferred to a carbon dioxide capture and compression unit 20 and is essentially treated therein as explained with reference to FIG. 1 already. However, instead of the low pressure steam of a steam stream D like in FIG. 1, the absorbing liquid (not shown) with which the carbon dioxide scrubber 21 is operated is regenerated using low pressure steam of a steam stream Q. The steam stream Q is generated by heating a water stream R withdrawn from the carbon dioxide scrubber 21 in the heat exchanger E1b. Therefore, in contrast to FIG. 1, none of the steam expanded in the intermediate pressure turbine IP is transferred as a steam stream to the carbon dioxide scrubber 21.

As to further explanations regarding the method 100, reference is made to the explanations relating to FIG. 1.

Figure 3:
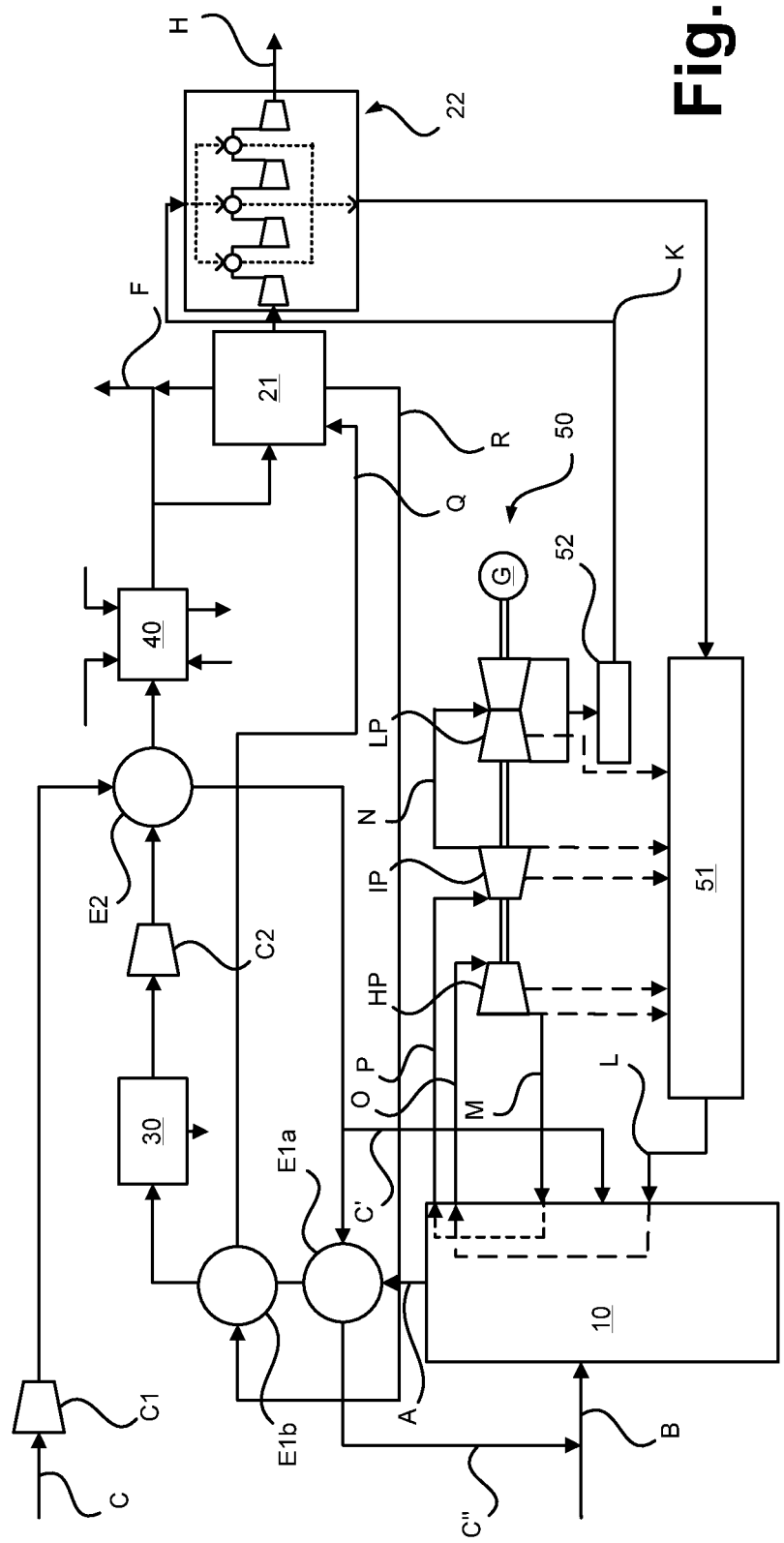
FIG. 3 illustrates a method in which a flue gas containing carbon dioxide is provided and in which the carbon dioxide in the flue gas is at least partially captured and compressed according to an embodiment of the invention.

FIG. 3 illustrates a method in which a flue gas containing carbon dioxide is provided and in which the carbon dioxide in the flue gas is at least partially captured and compressed according to an embodiment of the invention. The method largely corresponds to the method 100 according to FIG. 2. Only the differences will be described in the following.

The carbon dioxide compressor 22 in the carbon dioxide capture and compression unit 20 is, as mentioned, particularly a multi-stage compressor and carbon dioxide E withdrawn from the carbon dioxide scrubber 21 is compressed in the carbon dioxide compressor 22. Also the carbon dioxide compressor 22 according to FIG. 3 is adapted for intercooling the carbon dioxide between the individual compression stages. However, instead of using a stream G of cooling water, according to the method illustrated in FIG. 3, the condensate K from the low pressure turbine LP is supplied to the interstage cooling units and only then to the feed water heating arrangement 51 instead of supplying it directly to the feed water heating arrangement 51.

What we claim is:

1. A method for removing carbon dioxide from a carbon dioxide containing flue gas, said method comprising:
providing a carbon dioxide containing flue gas by combusting a carbonaceous fuel in a steam generating unit using combustion air, and
at least partially capturing and compressing carbon dioxide from the flue gas in a carbon dioxide capture and compression unit comprising a carbon dioxide scrubber operated with an absorbing liquid which is regenerated using steam,
wherein the combustion air used in the steam generating unit is at least partially heated using sensible heat of the flue gas and the steam used for regenerating the absorption liquid of the carbon dioxide scrubber is at least partially generated using sensible heat of the flue gas.

2. The method according to claim 1, wherein said method further comprises a sulphur removal unit for removing sulphur from the flue gas, and wherein the sensible heat of the flue gas used to at least partially heat the combustion air used in the steam generating unit and the sensible heat of the flue gas used for at least partially generating the steam used for regenerating the absorption liquid of the carbon dioxide scrubber are removed from the flue gas upstream of the sulphur removal unit.

3. The method according to claim 1, wherein, upstream of the steam generating unit, the combustion air used in the steam generating unit, after being heated using sensible heat of the flue gas, is split into a first stream of combustion air and a second stream of combustion air, wherein the first stream of combustion air is supplied directly to the steam generating unit without further heating and the second stream of combustion air is further heated using sensible heat of the flue gas and then combined with the carbonaceous fuel before being sent to the steam generating unit.

4. The method according to claim 1, wherein, upstream of the steam generating unit, the combustion air used in the steam generating unit, after being heated using sensible heat of the flue gas, is split into a first stream of combustion air and a second stream of combustion air, wherein the first stream of combustion air is supplied to the steam generating unit and the second stream of combustion air is combined with the carbonaceous fuel before being sent to the steam generating unit.

5. The method according to claim 4, wherein carbon dioxide obtained in the carbon dioxide scrubber from the flue gas is at least partially compressed in a carbon dioxide compressor of the carbon dioxide capture and compression unit, wherein steam is generated from feed water in the steam generating unit, and wherein the feed water used in the steam generating unit is at least partially preheated using compression heat withdrawn from the carbon dioxide compressed in the carbon dioxide compressor.

6. The method according to claim 1, wherein the carbon dioxide scrubber is operated with a caustic solution and/or an amine solution which is loaded with carbon dioxide in an absorbing tower and which is regenerated using the steam in a regeneration tower.

7. The method according to claim 1, wherein carbon dioxide obtained in the carbon dioxide scrubber from the flue gas is at least partially compressed in a carbon dioxide compressor of the carbon dioxide capture and compression unit, wherein steam is generated from feed water in the steam generating unit, and wherein the feed water used in the steam generating unit is at least partially preheated using compression heat withdrawn from the carbon dioxide compressed in the carbon dioxide compressor.

8. The method according to claim 7, wherein a multi-stage centrifugal compressor is used as the carbon dioxide compressor of the carbon dioxide capture and compression unit, and wherein compression heat is withdrawn from the carbon dioxide compressed in the multi-stage centrifugal compressor between at least two of the stages of the multi-stage centrifugal compressor.

9. The method according to claim 7, wherein the steam generated in the steam generating unit is at least partially expanded in a turbine unit, wherein condensate is formed in the turbine unit is at least partially used as the feed water which is used in the steam generating unit and is at least partially preheated using compression heat withdrawn from the carbon dioxide compressed in the carbon dioxide compressor.

10. The method according to claim 1, wherein the flue gas is at least in part transferred from the steam generating unit to one or more treatment units arranged downstream of the steam generating unit and thereafter to the carbon dioxide capture and compression unit arranged downstream of the one or more treatment units.

11. The method according to claim 10, wherein the one or more treatment units include a plurality of treatment units, and said plurality of treatment units include a particle removal unit and a sulphur removal unit.

12. The method according to claim 10, wherein the treatment units include a particle removal unit and a filtering unit and/or an electrostatic precipitator is used as the particle removal unit.

13. The method according to claim 10, wherein a temperature of the flue gas downstream of the steam generating unit and upstream of the one or more treatment units is at 150 to 450° C.

14. The method according to claim 10, wherein a temperature of the flue gas downstream of the steam generating unit and upstream of the one or more treatment units is at 150 to 300° C.

15. The method according to claim 10, wherein the sensible heat of the flue gas used to at least partially heat the combustion air used in the steam generating unit is removed from the flue gas downstream of the steam generating unit and upstream of the one or more treatment units.

16. The method according to claim 10, wherein the sensible heat of the flue gas used to at least partially generate the steam used for regenerating the absorption liquid of the carbon dioxide scrubber is removed from the flue gas downstream of the steam generating unit and upstream of the one or more treatment units.

17. The method according to claim 10, wherein a temperature of the flue gas downstream of the steam generating unit and upstream of the one or more treatment units is at 200 to 400° C.

18. The method according to claim 10, wherein a temperature of the flue gas downstream of the steam generating unit and upstream of the one or more treatment units is at 200 to 250° C.

19. The method according to claim 10, wherein the sensible heat of the flue gas transferred to the combustion air used in the steam generating unit is removed from the flue gas downstream of the steam generating unit and upstream of the one or more treatment units and wherein the sensible heat of the flue gas used to at least partially generate the steam used for regenerating the absorption liquid of the carbon dioxide scrubber is removed from the flue gas downstream of the steam generating unit and upstream of the one or more treatment units.

20. The method according to claim 19, wherein the combustion air used in the steam generating unit is initially completely heated using sensible heat of the flue gas transferred from the flue gas downstream of one of the one or more treatment units and wherein the combustion air used in the steam generating unit is afterwards partially heated using sensible heat of the flue gas transferred from the flue gas downstream of the steam generating unit and upstream of the one or more treatment units.

* * * * *